Figure 1:
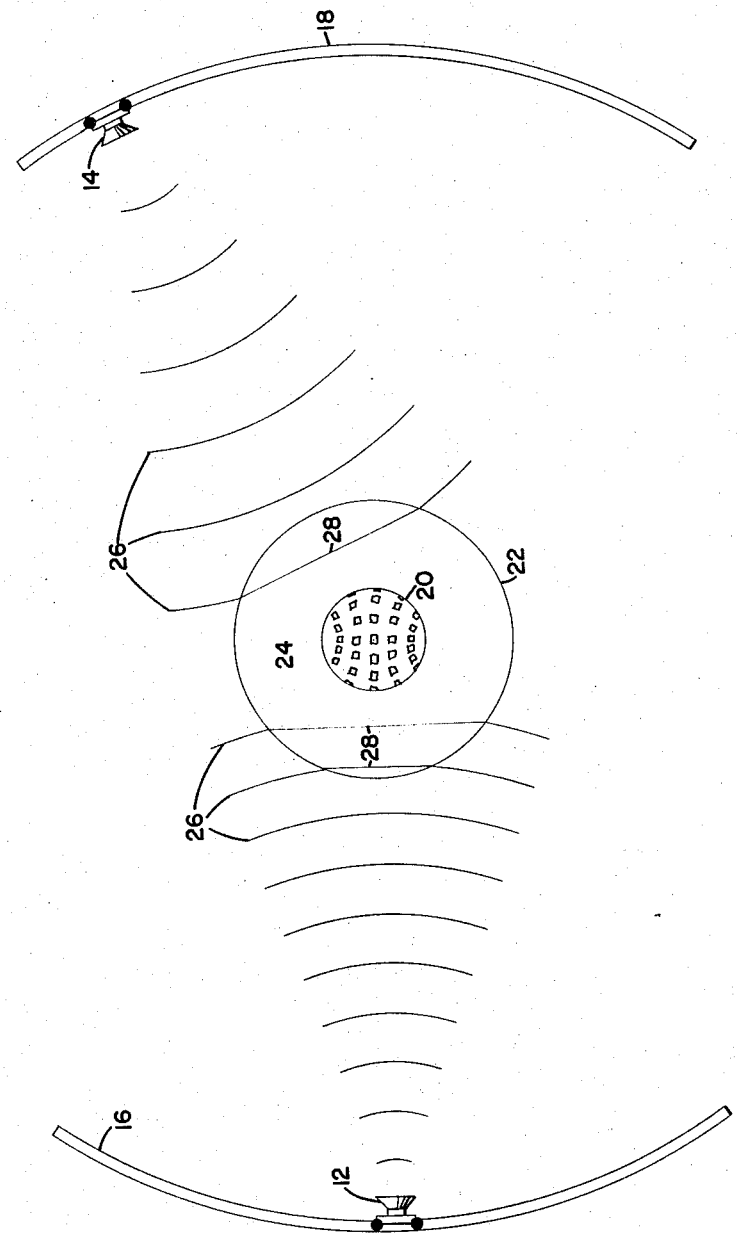

Jan. 24, 1967  A. W. SEAR  3,300,567
SONAR SIMULATOR APPARATUS

Filed Oct. 9, 1964

2 Sheets-Sheet 2

INVENTOR.
ARTHUR W. SEAR
BY *Charles J. Ungemach*
ATTORNEY

3,300,567
SONAR SIMULATOR APPARATUS
Arthur W. Sear, Arcadia, Calif., assignor to Honeywell Inc., Minneapolis, Minn., a corporation of Delaware
Filed Oct. 9, 1964, Ser. No. 402,882
5 Claims. (Cl. 35—10.4)

The present invention relates generally to devices for training sonar operators and more particularly to a system for producing realistic sonar signals to a mock receiver. Although the preferred embodiment is described herein in a sonar application, it should be understood that the technique may be employed to control sound waves in many varied applications.

To better understand the operation of the present invention, it is necessary to briefly describe the operational sonar system which it simulates. In one form of operational sonar a large number of individual acoustic transducers are spaced over the surface of a sphere. This transducer array is placed in the water where it can receive acoustic signals generated by or reflected from various targets. Since the targets are normally quite remote, these acoustic signals are received primarily in the form of nearly plane wave fronts which pass over the entire sphere actuating successive transducers along the surface. This generates a succession of out of phase signals from the transducers. However, if the transducer which is actuated first is provided with the proper electrical delay and each successive transducer is also delayed by diminishing amounts, then all of the signals will add and the resultant signal will be a summation of the signals from all of the transducers hit. If the target assumes a new bearing, however, the signal will strike the transducer array from a different direction, thus, actuating the transducers in a different succession than before. The transducer pulses will then be out of phase and non-additive. The electrical delay applied to each transducer may then be varied so that the first transducer actuated has the longest delay and each of the successively actuated transducers has a progressively smaller delay. Consequently, examination of the various delay times necessary to examine the signal, that is to keep all the signals in phase will provide an indication of which transducer is the first hit, and will thus indicate the bearing of the target.

In order to simulate this above described sonar system on land the present invention utilizes a similar spherical array of transducers but on a much smaller scale. Loud speakers are mounted on gimballed support members so that they may be positioned anywhere about the transducer array to simulate the position of a remote target. Recordings of various types of sonar signals are broadcast from the loud speakers to simulate sounds generated by a ship or an echo from a target. Since the loud speakers must be relatively close to the spherical array, the wave fronts from the speakers which strike the array are more spherical than the real life situation. In order to convert these wave fronts into nearly plane wave fronts as required by the apparatus the present invention utilizes a unique acoustical lens which surrounds the transducer array. In the preferred embodiment a spherical balloon completely encloses the spherical transducer array. An atmosphere of a fluid having a properly chosen index of refraction is provided within the balloon. The fluid having a different index of refraction than the outside air, thus, bends the sound as it enters and operates like a normal lens to collimate the acoustical waves so that they form more nearly plane wave fronts before striking the transducer array as if the source of the waves was far away. All of the above apparatus is contained within a soundproof room thereby eliminating stray extraneous noises and reflections which would show up as false signals to the trainee. Accordingly, it is an object of the present invention to provide a land based but realistic sonar simulator system which by means of a novel acoustical lens and speaker system can operate in a minimum of space.

Figure 2:
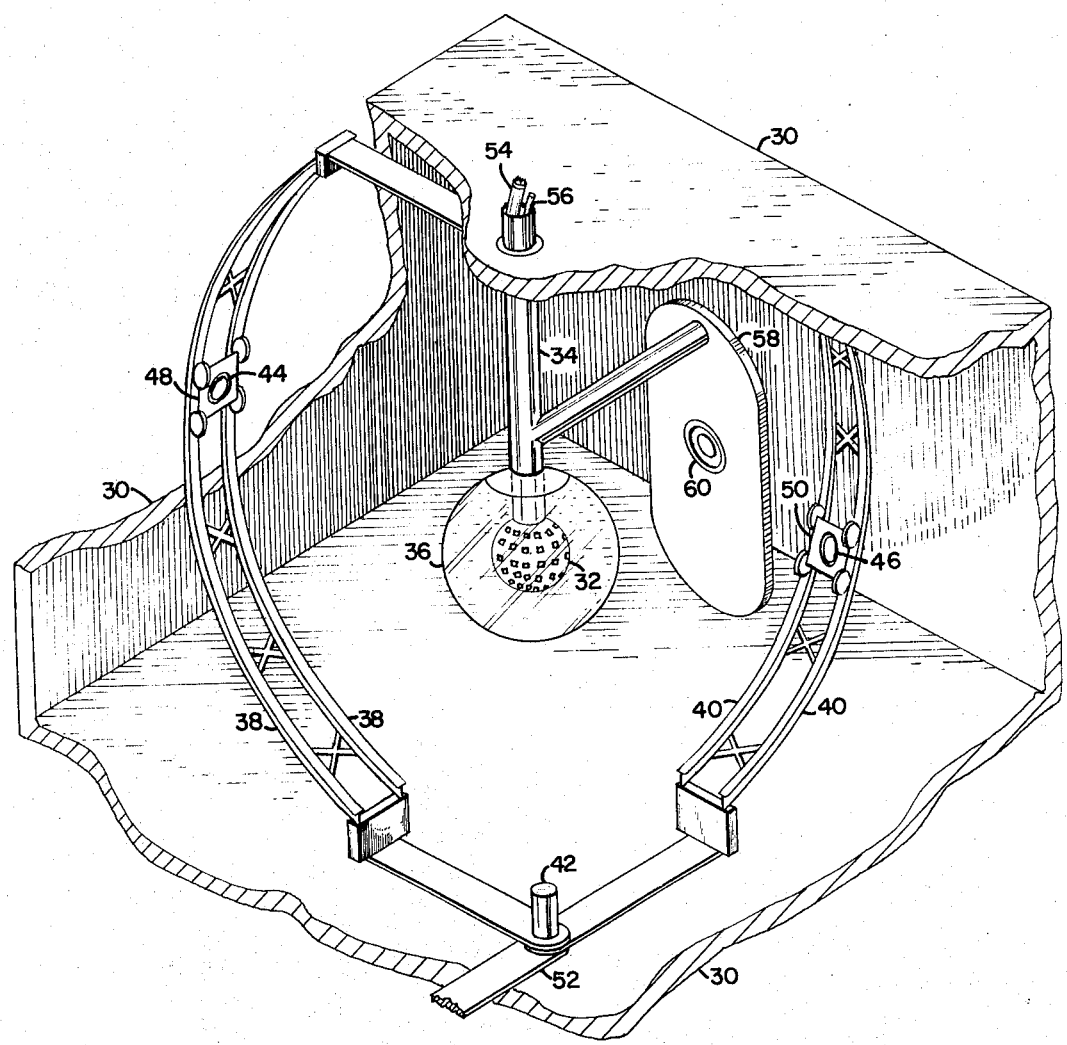

Further objects and advantages will become apparent as the details of the present invention are explained and clarified in the following description and drawings, in which:

FIGURE 1 is a diagram to illustrate the principle of operation of my invention, and FIGURE 2 is a schematic perspective view of a typical installation of my invention.

Referring to FIGURE 1, a pair of speakers 12 and 14 are shown which are adapted to ride along a pair of rails 16 and 18. A spherical transducer array 20 is shown positioned at the center of the radius of curvature of the two rails 16 and 18. This spherical transducer array 20 is similar to the sonar pick-up device used in operational sonar but is much smaller than the real counterpart. The transducers are disposed on the surface of the sphere in a pattern which has a 1 to 1 relationship to the full sized spherical transducer array used in actual sonar applications. Positioning array 20 at the center of curvature of tracks 16 and 18 insures that speakers 12 and 14 will remain at a constant distance from spherical array 20 while moving up and down along tracks 16 and 18. A spherical balloon 22 completely surrounds transducer array 20 and contains within it an atmosphere of an appropriately chosen fluid having an index of refraction different from air by an amount necessary to convert the curved wave front to a nearly plane wave front. It has been found that carbon dioxide is satisfactory for the purpose. The carbon dioxide atmosphere is indicated generally by numeral 24. As stated, the difference in index of refraction between the carbon dioxide atmosphere 24 and the outside atmosphere causes spherical balloon 22 to act as a spherical lens. Consequently, a set of spherical wave fronts 26 from speakers 12 and 14 are collimated into parallel plane wave fronts indicated by numeral 28. Thus, although the speakers are only a short distance away the nearly parallel wave fronts 28 appear to transducer array 20 as coming from a great distance. The direction from which wave fronts 26 approach transducer array 20 is indicated by determining which of the particular transducers in array 20 is actuated first just as with the operational equipment.

Since the velocity of sound in carbon dioxide at room temperature is only about one-fifth of that in sea water the transducer array 20 need only be about one-fifth of the normal size in order to obtain the correct operation. Speakers 12 and 14 should be located at the correct focal length from the acoustical lens 22 so that spherical waves emanating from the speakers will be flattened into nearly parallel plane wave fronts within the lens 22. It was found in the preferred embodiment that a balloon having a diameter of 60 inches and a corresponding focal length of 108.5 inches would result in an installation of convenient dimensions although other sizes may be utilized as well. Carbon dioxide was used in the acoustical lens balloon in the preferred embodiment because the velocity of sound in this gas is slower than in any other of the non-corrosive gases. It should be understood, however, that many other gases may be employed as successfully.

In FIGURE 2 a sound insulated room 30 is shown partially cut away so as to reveal the apparatus of the present invention in a typical installation. A scaled down directionally sensitive transducer array 32 is shown supported by a member 34. A spherical balloon 36 surrounds array 32 to form the acoustical lens already described. A pair of steel guide tracks 38 and 40 are shown in FIGURE 2 as pivoted about a shaft 42 and support member 34. Shaft 42 is axially aligned with transducer array 32 so that guide tracks 38 and 40 may be rotated about transducer array 32 in a horizontal plane and remain at a constant distance therefrom. Tracks 38 and 40 are curved in order to maintain a constant distance between a pair of loud speakers 44 and 46 and the array 32 when the loud speakers are moved up and down tracks 38 and 40 by means of a pair of trucks 48 and 50. Thus, no matter what bearing or elevation the speakers take they are always at the correct distance from array 32.

To simulate a problem situation the loud speakers 44 and 46 are positioned in the desired bearing and elevation and are driven from signals that have been attenuated so that the intensity of sound reaching the transducer array represents the distances at which targets might naturally appear. Each speaker can thus simulate a particular target at an assumed range and bearing. A library of underwater sounds are recorded and transmitted by means not shown to speakers 44 and 46 to provide realistic underwater sounds for almost any common situation. When a spherical wave from one of the speakers 44 and 46 meets the acoustical lens 36, the wave front is flattened to form a nearly plane wave that continues on through the transducer array 32. Since this array is proportionally smaller for the lower speed of sound in carbon dioxide than water each transducer on array 32 will receive this signal with a time delay equal to the delay the corresponding hydrophone would experience when receiving a signal from a distant target at this bearing and elevation. If transducer array 32 is connected to the proper delay lines available in the real life sonar equipment the circuits will behave exactly as they would in the real life situation. It was found in the preferred embodiment that changes in the focal length caused by positioning the speaker 44 or 46 up to one foot closer or one foot farther away from balloon 36 led to negligible error in the received signal. Consequently, tracks 38 and 40 and other tracks that may be supported by shaft 42, for instance, as shown by cut-away radius arm 52, may be disposed at slightly different radii so that they may revolve around transducer array 32 without interfering with each other. In this way it will be possible to position two lound speakers at the same bearing and elevation to simulate two targets at the same bearing and elevation. In FIGURE 2, the electrical connections to array 32 are provided by a cable 54 and the carbon dioxide for acoustical lens 36 is provided by a hose 56. The walls of room 30 should exclude external noise fairly well to keep the ambient noise level within tolerable limits. This requirement can be eased considerably by operating speakers 44 and 46 at high volume levels and using insensitive microphone elements or by providing attenuation of the electrical signal from the transducers to reduce the signal to the level found in the operational environment. The interior surface of the walls of room 30 should be covered with a non-reflecting, sound absorbing material, similar to the treatment that is used on the walls of Anechoic chambers. This usually consists of a geometric pattern of thin wedges cut from a plastic material which is not excessively expensive. Echos from walls and ceiling should be suppressed to prevent voltages with incorrect time delays from combining with the signal in the transducer array 32. The directional sensitivity characteristics of the sonar set may be simulated more realistically by partially shielding the transducer array 32 from the sound sources in certain directions. For example, the decreased sensitivity to sounds coming from the rear, called hull baffling, may be simulated by placing a shaped partial sound shield 58 on the rear side of the transducer array 32. Further realism may be provided by placing a loud speaker 60 on sound shield 58 to simulate the transducer array's own ship noises such as propeller noises.

Although a spherical transducer array has been shown in the preferred embodiments of FIGURES 1 and 2, it should be understood that this target simulation system may be utilized for many varied forms of sonar devices. Also many variations of the system described may be employed. For instance, a speaker may be located near the floor of room 30 to simulate reception via "bottom bounce" situations. With proper delay and attenuation of two speakers, multiple path reception can be simulated. If desired, more than one speaker may travel on a single track and the number of tracks may be increased to provide for a greater number of targets.

It will be obvious to those skilled in the art that many further modifications and variations of this system may be made without departing from the scope and spirit of the invention as defined by the claims.

I claim as my invention:

1. In a training device for simulating sonar operation, in combination:
   a transducer array for receiving acoustical signals and determining the direction thereof; and
   a plurality of acoustical speakers moveably supported about said transducer array and operable to generate sonar-like signals from any direction thereto.

2. Apparatus for simulating real life targets in a sonar system comprising:
   a receiving means operable to detect and determine the direction of incoming acoustical waves;
   a plurality of moveable sources of acoustical waves, said sources adapted to project sonar-like acoustical waves from any direction toward said receiving means; and
   a spherical acoustical lens enclosing said receiving means so as to form the acoustical waves from said sources into more nearly plane waves which strike said receiving means.

3. A device for simulating the reception of sonar signals comprising in combination:
   a plurality of loud speakers operable to produce sonar-like acoustical signals;
   receiving means operable to determine the direction of received acoustical signals;
   a spherical balloon surrounding said receiving means and filled with gas of a density different from that of the atmosphere so as to collimate the received signal before it reaches the receiving means; and
   a plurality of support members adapted to support the loud speakers in any position about said receiving means.

4. A device for simulating the reception of sonar signals comprising in combination:
   a directionally sensitive sonar detector;
   means supporting said detector;
   a plurality of semicircular tracks;
   means pivoting said tracks around said detector;
   a plurality of loud speakers adapted to follow said tracks and generate acoustical signals toward said detector from any direction; and
   acoustical lens means contiguous to said detector and operable to collimate acoustical waves before they reach said detector.

5. A device for simulating the reception of sonar signals comprising in combination:
   a sound suppressing room;
   a directionally sensitive sonar detector;
   means supporting said detector within said room;
   a plurality of semicircular tracks;

means pivoting said tracks around said detector and within said room;
a plurality of loud speakers adapted to follow said tracks and generate acoustical signals toward said detector from any direction;
a sound transparent balloon enclosing said detector; and
gas means within said balloon which cause said balloon to collimate acoustical waves.

References Cited by the Examiner

UNITED STATES PATENTS

| | | | |
|---|---|---|---|
| 2,405,591 | 8/1946 | Mason | 35—10.4 |
| 2,420,676 | 5/1947 | Peterson | 340—8 |
| 2,827,620 | 3/1958 | Batchelder | 340—6 |

CHESTER L. JUSTUS, *Primary Examiner.*

T. H. TUBBESING, *Assistant Examiner.*